United States Patent
Mueller

(10) Patent No.: US 7,209,816 B2
(45) Date of Patent: Apr. 24, 2007

(54) SYSTEM FOR REMOTE CONTROL OF VEHICLE FUNCTIONS AND/OR INQUIRY OF VEHICLE STATUS DATA

(75) Inventor: Achim Mueller, Gerlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/962,777

(22) Filed: Oct. 12, 2004

(65) Prior Publication Data
US 2005/0107928 A1    May 19, 2005

(30) Foreign Application Priority Data
Oct. 10, 2003    (DE) ................ 103 47 827

(51) Int. Cl.
*G08G 1/123* (2006.01)
*G01C 21/00* (2006.01)

(52) U.S. Cl. .............. 701/33; 455/418; 340/426.16

(58) Field of Classification Search ............ 701/33, 701/29, 31, 32, 35; 455/418, 423, 424, 507; 340/426.16, 426.13
See application file for complete search history.

(56) References Cited

U.S. PATENT DOCUMENTS

| | | | | |
|---|---|---|---|---|
| 6,694,235 | B2 * | 2/2004 | Akiyama | 701/33 |
| 6,724,322 | B2 * | 4/2004 | Tang et al. | 340/989 |
| 6,735,503 | B2 * | 5/2004 | Ames | 701/29 |
| 2002/0004720 | A1 * | 1/2002 | Janoska | 704/270 |
| 2002/0128769 | A1 * | 9/2002 | Der Ghazarian et al. | 701/207 |
| 2003/0088347 | A1 | 5/2003 | Ames | |
| 2003/0151507 | A1 * | 8/2003 | Andre et al. | 340/539.13 |

FOREIGN PATENT DOCUMENTS

DE    102 17 398 A1    1/2003

* cited by examiner

*Primary Examiner*—Dalena Tran
(74) *Attorney, Agent, or Firm*—Akerman & Senterfitt; Stephan A. Pendorf; Yonghong Chen

(57) ABSTRACT

The invention concerns a system for remote control of vehicle functions and/or inquiry of vehicle status data, including a first communication device (25) for bidirectional wireless communications with at least one vehicle communication unit (40), wherein control commands for remote control of vehicle functions and/or inquiries for retrieving vehicle status data are transmitted via the first communication device (25), and further including a second communication unit (220) for establishing speech communication with a user of the system. According to the invention a computer (20) is provided for translation of speech information received via the second communication unit (220) into control commands and/or inquiries, which are then transmitted by the first communication device (25). Command controls for remote control of vehicle functions are provided and inquiries for requesting vehicle status data are provided. The computer (20) is adapted to translate information regarding the vehicle (10) received via the first communication device (25) into speech information and to transmit this information via the second communication unit (220) in the form of speech.

12 Claims, 3 Drawing Sheets

SYSTEM FOR REMOTE CONTROL OF VEHICLE FUNCTIONS AND/OR INQUIRY OF VEHICLE STATUS DATA

BACKGROUND OF THE INVENTION

1. Field of the Invention

The invention concerns a system for the remote control of vehicle functions and/or for the inquiry or retrieval of vehicle status data of the general type set forth in the precharacterizing portion of Claim 1.

2. Related Art of the Invention

U.S. Pat. No. 6,028,537 describes a system for the remote control of vehicle functions and requesting vehicle status data, which transmits, via a communication device, control commands for remote control of vehicle functions and inquiries for retrieving vehicle status data. The user can use a voice telephone to instruct an employee of a call center of the system to transmit control commands.

SUMMARY OF THE INVENTION

It is the task of the invention to provide an improved system for the remote control of vehicle functions and/or for inquiry of vehicle status data, which works more efficiently.

The invention solves this task by providing a system according to the characterizing portion of patent Claim 1.

Advantageous further developments of the invention are set forth in the dependent claims.

The basic idea of the invention is to simplify the system for use by the user, in that a computer in a geographically fixed unit is made available to the user, with which he can communicate via speech communication. This computer is a type of speech recognition computer, which is able to recognize certain key words in speech and therewith can determine which functions and in which manner are to be remote controlled and/or which status data of which functions are being inquired about. Accessing the computer by verbal communication is particularly advantageous for the user, since he does not require special knowledge to operate the computer, and also for example while traveling, where in certain cases he may have available to him only the possibility of verbal communication, in which case in accordance with the present invention he can establish access at any time with the computer in the geographically fixed center.

In addition, the user can optionally be provided with access to the computer via the internet and/or the mobile internet. In this manner the user has available a series of possibilities for accessing the computer and can therewith select the type of access most suitable for him.

BRIEF DESCRIPTION OF THE DRAWING

The invention will now be described on the basis of the illustrative embodiments shown in the figures. There is shown in.

Parts in the figures corresponding to each other are indicated with the same reference numbers.

DETAILED DESCRIPTION OF THE INVENTION

Figure 1:
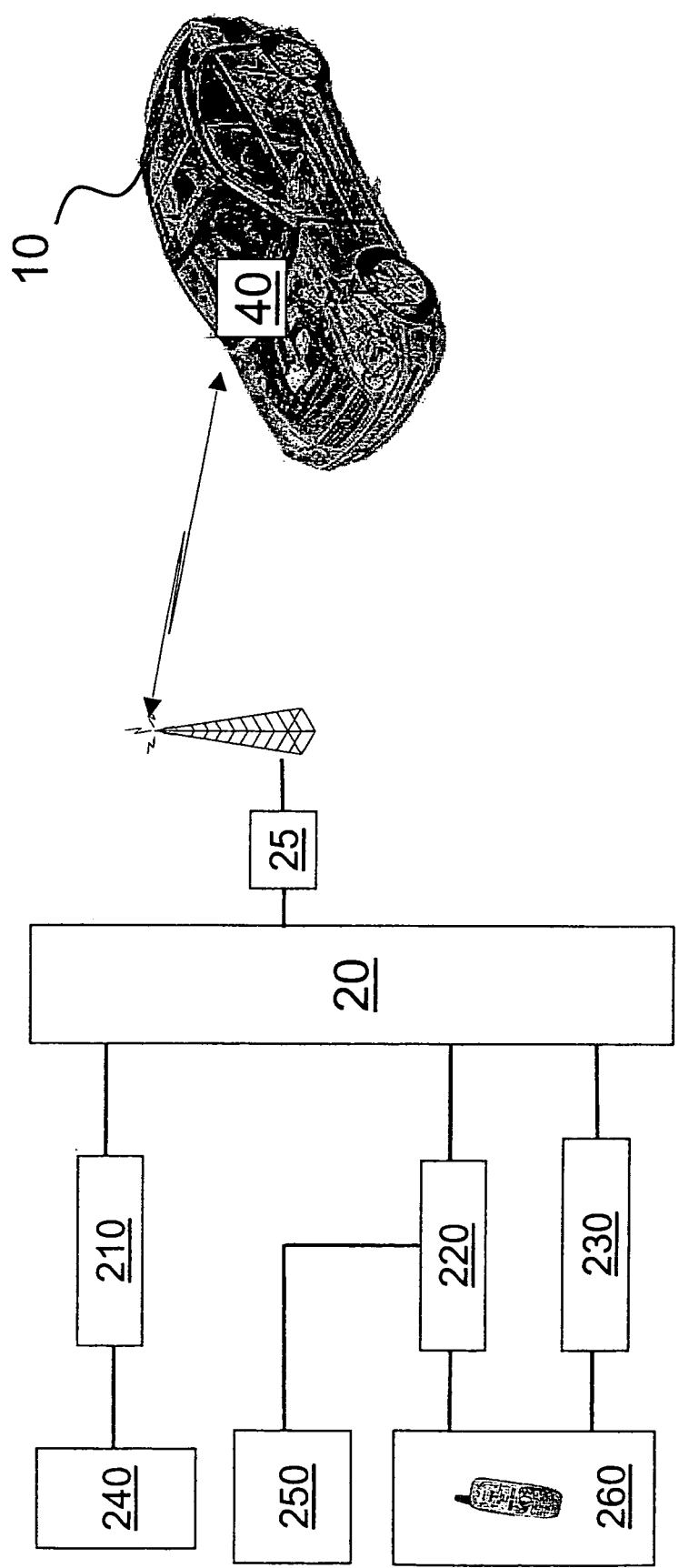
FIG. 1 a schematic representation of the system for remote control of vehicle functions and/or inquiry of vehicle status data, FIG. 2 a schematic representation of a vehicle data bus system with a vehicle communication unit, and FIG. 3 an example of the sequence of communications between the user and the computer.

FIG. 1 schematically shows the communication connections or network for a computer 20 associated with a geographically fixed center. A user gains access to the computer 20 in the geographically fixed center for example via the internet 210 using his home computer 240. Alternatively, or additionally, the user can gain access to the computer 20 via a mobile telephone 260 using a mobile internet, for example WAP (Wireless Application Protocol). After an authentication the user is associated with a specific vehicle 10. Via the internet 210 and/or the mobile internet 230 the user can transmit to the computer 20, following user authentication, control commands for the remote control of vehicle functions and/or for inquiry regarding the status vehicle functions. The computer 20 transmits the control commands and/or the interrogatories for the status data via the communication unit 25 to the vehicle 10. A further communication unit 220 connected to the computer 20 is provided for establishing speech communication with the user. The vehicle 10 receives the control commands and/or the status interrogatory via the communication unit 40.

If control commands are transmitted to the vehicle 10, then after receipt of a control command it is verified in the vehicle 10 that the energy stored in the vehicle battery is sufficient to carry out the requested function. If sufficient energy is stored in the battery, then the function is carried out and the appropriate reply message is transmitted to the computer 20 via the communication unit 40. If the vehicle 10 determines that the energy stored in the battery is insufficient to carry out the requested function, and/or if after carrying out thereof the energy supply would lie below a predetermined threshold, then the function is not carried out and the appropriate reply message is transmitted to the computer 20 via the communication unit 40.

If status inquiries are transmitted to the vehicle 10, then the communication unit 40 transmits the answer to the requested status data to the computer 20.

Figure 2:
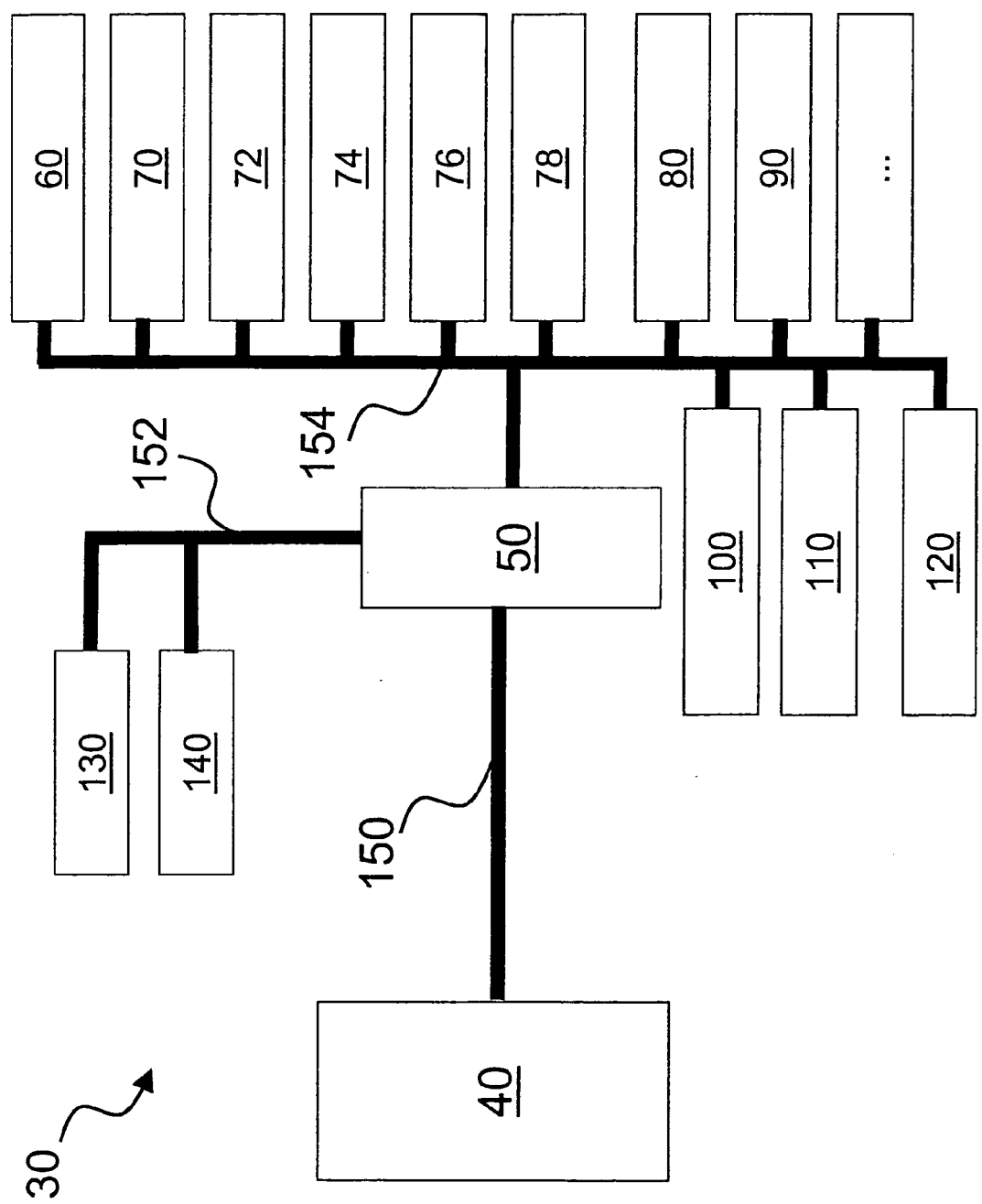

FIG. 2 shows a schematic representation of a vehicle data bus system 30 with a communication unit 40. The vehicle data bus system 30 shown in FIG. 2 includes a gateway 50, a unit "keyless go" 60, door opening devices 70, 72, 74, 76, a signal receiver and control module 78, an ignition lock control device 80, a roof operating unit 90, a vehicle independent heater 100, a seat heater 110, an energy control device 120, a display and operation unit 130, an instrument cluster (instrument control device) 140 and data buses 150, 152, 154. The data bus 150 is, for example, a CAN class D bus. The data bus 152 is, for example, a so-called "backbone", that is a data bus with very high data transmission rate. The data bus 154 is, for example, a CAN class B bus or CAN class C bus. The gateway 50 establishes the data transmission between the various data buses 150, 152, 154. The units 40, 50, 60, 70, 72, 74, 76, 78, 80, 90, 110, 120, 130, 140 can, among themselves, also be discretely connected by circuits and/or be wireless networked. Also conceivable are mixtures of topologies, discrete connections and/or data buses. It is likewise conceivable to incorporate various units in one housing. One or more of the data buses can, for example, also be a ring bus, in particular an optical bus such as, for example, D2B (Domestic Digital Bus) or MOST (Media Oriented Systems Transport).

Preferably a number of vehicle functions are incorporated in the vehicle units 50, 60, 70, 72, 74, 76, 78, 80, 90, 110, 120, 130, 140, which are controllable via control signals, which can be received via the communication unit 40 from the computer 20 which is housed in a geographically fixed center. The control signals are transmitted via one or more data buses to the appropriate unit to be controlled, and this then carries out the desired action.

Preferably, replies to questions regarding status data transmitted via the communication unit 40 are received, via the communication unit 25, in the computer 20 housed in the geographically fixed center. These inquires regarding status data are replied to by the vehicle 10 on the basis of the actual status data of the vehicle units 50, 60, 70, 72, 74, 76, 78, 80, 90, 110, 120, 130, 140, in that the requested status data are transmitted via the communication unit 40 to the computer 20.

The functions associated with the vehicle units 50, 60, 70, 72, 74, 76, 78, 80, 90, 110, 120, 130, 140 include, for example, a locking function for locking the vehicle doors, as well as the trunk lid and the fuel lid, a vehicle independent heater, a climate control or air conditioner, functions for opening and closing windows and the sliding roof, a seat heater, etc. Functions to be carried include for example the opening or closing of windows, the locking of the vehicle, the activation or deactivation of the vehicle independent heater, the deicing of the windshield and/or the ventilation of the vehicle, etc. Beyond these, functions to be carried out include the programming of individual functions, for example programming of a time for activation of vehicle independent heating, etc.

Figure 3:
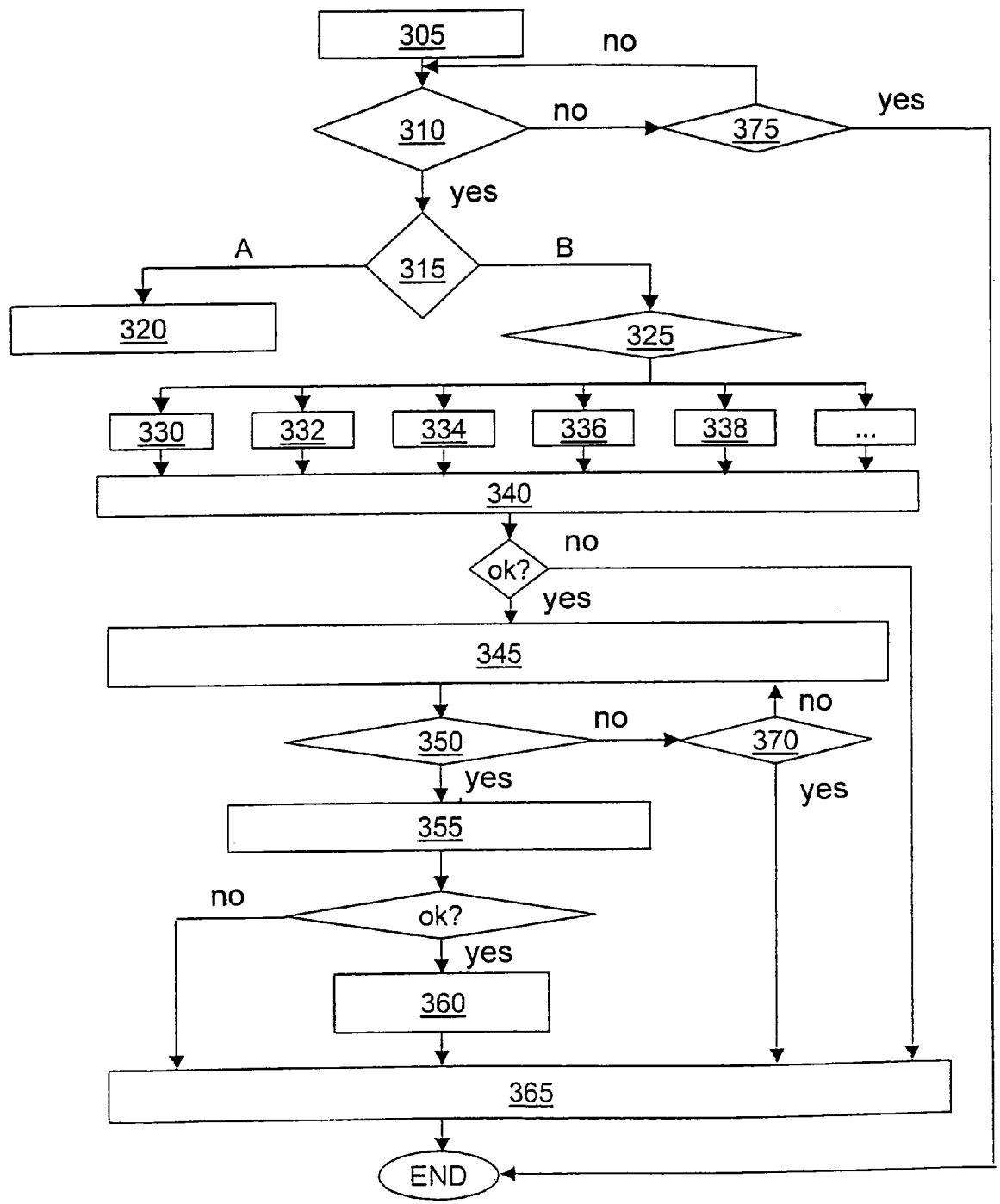

In FIG. 3 an example of the sequence of the communication of the user with the computer is shown. In step 305 the user uses a fixed network telephone 250 or a mobile telephone 60 to call in to the center, where the computer 20 receives the call. In step 310 the authenticity of the user is checked by the computer 20, for example using a password. This occurs for example by the comparison of a previously stored password with the password spoken by the user and/or by speech recognition, for example, on the basis of a sequence of numbers spoken by the user. In the case of a false authentication the branch "no" is followed. In step 375 it is checked, whether in a second attempt the authenticity is verified.

In the case of no—branch "no"—step 310 is once again followed through and the user obtains a second opportunity to authenticate. If the second authentication is again false—branch "no" of step 310 and branch "yes" of step 375, then the process is ended. In the case of a successful authentication the caller is associated with a vehicle matching the authentication. The caller can decide in step 315 whether he would like to speak with a human employee of the center. In the case of "yes" the process proceeds via the branch "A" from step 315 to step 320, where the user speaks with a human employee of the center. In the case of selection of the speech recognition system—branch "B" from step 315—the user passes to the speech recognition system of the computer 20, where the user in step 325 can decide between various services. After making a decision for a service the user can select this service simply by speaking the service name and/or by speaking a number associated with the service. Examples of selectable services include a locking function for locking the vehicle doors, as well as the trunk lid and the gas cap lid, a vehicle independent heater, a climate control, functions for opening and closing of windows and the sliding roof, a seat heater, etc. Depending upon the selected function various activities to be carried out can be selected in steps 330, 332, 334, 336, 338, for example the programming of a start time, the canceling of a start time, the immediate activation of a function, the immediate ending of a function, the locking of the entire vehicle and/or the inquiry for status data of the function. After receiving the request the system checks, in step 340, whether there is always authorization to access a special service and/or whether this user has the authorization to access the particular associated service. If no authorization exists—branch "no"—then the user is informed thereof in step 365 by the computer 20 via an appropriate speech output and the process is ended. If authorization exists—step "yes"—then in step 345 the communication unit 25 is activated, in order to transmit the question and/or command to the vehicle 10.

In the case of an unsuccessful communication attempt branch "no" is followed in step 350. In step 370 it is checked whether this is the second communication attempt. In the case of no—branch "no"—step 345 is again carried out and a second attempt to establish communication with the vehicle 10 is undertaken. If the second communication attempt fails anew—branch "no" in step 350 and branch "yes" in step 370—then the process is ended. In the case that communication has been successfully established with the vehicle 10 it is checked in vehicle 10 in step 355 whether the desired service can be carried out. Therein, for example in the case of the remote control of functions, the supply of energy remaining in the vehicle battery is also taken into consideration. If the service cannot be carried out in the vehicle—branch "no"—then the user is informed in step 365 by the computer 20 via an appropriate speech output and the process is ended.

If the service can be carried out in the vehicle, then it is carried out and the result is transmitted in step 360 to the computer. In the case of a status inquiry, the requested status data are transmitted in step 360 to the center. The computer informs the user in step 365 by an appropriate speech output. Thereafter the process is ended.

The invention claimed is:

1. A system for remote control of vehicle functions and/or inquiry of vehicle status data, comprising:
    a first communication unit (25) for bidirectional wireless communications with at least one vehicle communication unit (40), wherein control commands for remote control of vehicle functions and/or inquiries for retrieving vehicle status data are transmitted to the vehicle communication unit (40) via the first communication unit (25),
    a second communication unit (220) for establishing speech communication with a user of the system who provides speech information regarding remote control of vehicle functions and/or inquiry of vehicle status data,
    a computer (20) connected to the second communication unit (220) for translation of the speech information received via the second communication unit (220) into control commands and/or inquiries, which are then transmitted to the vehicle communication unit (40) by the first communication unit (25),
    wherein command controls for remote control of vehicle functions are provided and wherein inquiries for requesting vehicle status data are provided, wherein the computer (20) is adapted to translate information regarding the vehicle (10) received via the first communication unit (25) into speech information and to transmit this information via the second communication unit (220) in the form of speech to the user.

2. The system according to claim 1, wherein in the computer (20), on the basis of authentication data received from the user, an association of the user with a specific vehicle is made.

3. The system according to claim 2, wherein the system further checks whether the user has authorization to remotely control a particular function.

4. The system according to claim 1, wherein the computer (20) is connected with at least one further network (210, 230), in particular the internet (210) and/or a mobile internet (230).

5. The system according to claim 4, wherein the user can transmit, via the at least one additional network (210, 230), information to the computer (20), which is translated by the computer (20) into commands for remote control of vehicle functions and into inquiries for requesting vehicle stains data, and transmitted via the first communication unit (25).

6. The system according to claim 4 wherein the computer (20) receives information via the first communication unit (25) and transmits this, via the at least one additional network (210, 230), to the associated user.

7. The system according to claim 1, wherein the first communication unit (25) further receives a reply message that a control command for remote control of a vehicle function cannot be performed if energy stored in a battery in the vehicle (10) is below a predetermined threshold to carry out the vehicle function.

8. The system according to claim 1, wherein the control commands for remote control of vehicle functions include locking of vehicles doors, sliding root windows, or gas cap lid.

9. The system according to claim 1, wherein the control commands for remote control of vehicle functions include control of heaters, climate control, and seat heaters.

10. The system according to claim 1, wherein the control commands for remote control of vehicle functions include programming of a start time, and end time, a cancellation of a start time, an immediate activation of a function, or an immediate ending of a function.

11. The system according to claim 1, wherein the computer (20) is further programmed to recognize key words corresponding to the vehicle functions that are remotely controlled.

12. A method for remote control of vehicle functions and/or inquiry of vehicle status data, comprising:

establishing bidirectional wireless communications between a first communication unit (25) and at least one vehicle communication unit (40), wherein control commands for remote control of vehicle functions and/or inquiries for retrieving vehicle status data are transmitted to the vehicle communication unit (40) via the first communication unit (25), establishing speech communication between a user and a second communication unit (220), wherein the user provides speech information regarding remote control of vehicle functions and/or inquiry of vehicle status data, translating by a computer (20) connected to the second communication unit (220) the speech information received via the second communication unit (220) into control commands and/or inquiries, which are then transmitted to the vehicle communication unit (40) by the first communication unit (25), translating information regarding the vehicle (10) received via the first communication unit (25) into speech information and to transmitting this information via the second communication unit (220) in the form of speech to the user.

* * * * *